(12) United States Patent
Donoho

(10) Patent No.: US 12,063,923 B2
(45) Date of Patent: *Aug. 20, 2024

(54) BIRD DETERRENT WITH INSERTION MOLDED METAL SPIKES

(71) Applicant: Bird-B-Gone, Inc., Santa Ana, CA (US)

(72) Inventor: Bruce Donoho, Laguna Beach, CA (US)

(73) Assignee: Bird-B-Gone, Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,512

(22) Filed: Jul. 31, 2023

(65) Prior Publication Data

US 2023/0371496 A1 Nov. 23, 2023

Related U.S. Application Data

(63) Continuation of application No. 17/176,652, filed on Feb. 16, 2021, now Pat. No. 11,712,036.

(51) Int. Cl.
*A01M 29/32* (2011.01)
*E04D 13/00* (2006.01)

(52) U.S. Cl.
CPC ........... *A01M 29/32* (2013.01); *E04D 13/004* (2013.01)

(58) Field of Classification Search
CPC .............................. A01M 29/32; E04D 13/004
USPC ........................................................ 52/101
See application file for complete search history.

(56) References Cited

U.S. PATENT DOCUMENTS

| 6,668,505 | B1 | 12/2003 | Hohmann |
| 7,017,318 | B1 | 3/2006 | Hohmann |
| 8,479,456 | B1 * | 7/2013 | Donoho ................ A01M 29/32 43/1 |
| D693,899 | S * | 11/2013 | Donoho ........................ D22/119 |
| 8,601,747 | B2 | 12/2013 | Donoho |
| 8,689,498 | B2 * | 4/2014 | Donoho .................. B29C 45/00 43/1 |
| 9,504,245 | B2 | 11/2016 | Donoho |
| 10,151,103 | B1 | 12/2018 | Hohmann |
| 2003/0208967 | A1 * | 11/2003 | Riddell ................. A01M 29/32 52/101 |
| 2004/0216393 | A1 | 11/2004 | Hall |
| 2014/0041318 | A1 | 2/2014 | Donoho |

FOREIGN PATENT DOCUMENTS

| CN | 202374949 | 8/2012 |
| EP | 2014162 | 1/2009 |

OTHER PUBLICATIONS

Network, Avipoint G20 Marine (50m) https://www.networkbird.net/products/avipoint/avipoint-g20/avi140a_avipoint-g20-(5m-stacks).

* cited by examiner

*Primary Examiner* — Brent W Herring
(74) *Attorney, Agent, or Firm* — Fish IP Law, LLP

(57) ABSTRACT

The present invention provides deterrent devices for birds and other animals. The device includes a plurality of wires/spikes insertion molded into an elongated plastic base. Each of the wires extends out left and right sides of the base, with alternating angles between 50 and 90°. The bends of at least three sequential wires on the left side of the base are substantially colinear, and the bends of at least three sequential wires on the right side of the base are substantially colinear.

11 Claims, 5 Drawing Sheets

Cross Section A

Cross Section B

BIRD DETERRENT WITH INSERTION MOLDED METAL SPIKES

This application is a continuation application of, and claims priority to, U.S. patent application Ser. No. 17/176,652, filed on Feb. 16, 2021. All extrinsic materials identified herein are incorporated by reference in their entirety.

FIELD OF THE INVENTION

The field of the invention is animal deterrents, especially as they relate to bird deterrents.

BACKGROUND

The following description includes information that may be useful in understanding the present invention. It is not an admission that any of the information provided herein is prior art or relevant to the presently claimed invention, or that any publication specifically or implicitly referenced is prior art.

The presence of birds on windowsills, roof tops, and other surfaces is often undesirable due to their droppings, which among other things are unsightly, can that facilitate bacterial and fungal growth, and can be difficult to clean-up.

It is known to repel birds by mounting an elongated strip (base) of metal or plastic upon a roof or other surface, with a plurality of pointed objects, such as spikes and the like extending from the base. Where the base and the spikes are comprised entirely of plastic, it is known to product the entire device by injection molding. However, where metal spikes are used with a plastic base, there is difficulty in affixing the spikes to the base. U.S. Pat. No. 9,504,245 solves the problem by inserting flat-bottom "U"-shaped metal spikes upward from the bottom of the base, and then crushing the plastic base around the flat bottom portion of the inserted metal. U.S. Pat. No. 8,601,747 solves the problem by snapping flat-bottom "U"-shaped metal spikes into spike stabilizers extending upwards from the base, or inserting the flat-bottom "U"-shaped metal spikes into spike stabilizers, and then melting the plastic about the metal.

The prior art also teaches instances of metal spikes being insertion molded into a plastic base. See the product shown in FIG. 1 (https://www.networkbird.net/products/avipoint/avipoint-g20/avi140a_avipoint-g20-(5m-stacks)). Unfortunately, that design extends the flat-bottoms of the "U"-shaped metal spikes into stabilizing side pieces, which utilizes an unnecessary amount of plastic (in the base) and metal (of the metal spikes).

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for an improved animal deterrent where the device is produced cost effectively and friendly to the environment.

SUMMARY OF THE INVENTION

The inventive subject matter provides apparatus, systems, and methods for deterrent devices for birds and other animals. Preferred device includes an elongated plastic base having a top and a bottom, and a substantially rectangular vertical cross-section. At least first, second, and third wires/spikes are insertion molded into the base. Each of the wires extends out both left and right sides of the base, and bend upwardly at desired angles. The bent portions of the wires (referred to herein as bends) are positioned in close proximity to the substantially planar sides of the base.

The right and left bends of the first, second, and third wires are substantially colinear on their corresponding sides. As used herein, the term "sequential" means that there is no intervening wire/spike bend between the first and second bends, and between the second and third bends. For example, in FIG. 2, the first, second, and third sequential bends are (261R, 262R, and 263R), as are (262R, 263R, and 264R), but not (261R, 263R, and 264R) because bend 262R is intervening. Similarly, bends 261R, 263R, and 265R are not sequential because of intervening bends 262R and 264R.

Those skilled in the art will appreciate that as used herein, "sequential first, second, and third wires" refers to any three sequentially positioned wires. The term does not require that the "sequential first, second, and third wires" are first, second, and third wires from an end of the base. Accordingly, "sequential first, second, and third wires" could refer, for example, to the fifth, sixth, and seventh wires as viewed from an end of the base.

In preferred embodiments, the spike ends of sequential wires alternate upwards in different directions according to the degree of bend in the corresponding bends. For example, left bends of the first and third wires of the device are configured to point the corresponding left ends upwards between 90° and 70° with respect to a plane of the bottom of the base. The right bends of the first and third wires are configured to point the corresponding right ends upwards between 50° and 80° with respect to the plane of the bottom of the base.

Additionally, the left bends of the second and fourth wires are configured to point the corresponding left ends upwards between 50° and 80° with respect to the plane of the bottom of the base, and the right bends of the second and fourth wires are configured to point the corresponding right ends upwards between 90° and 70° with respect to the plane of the bottom of the base.

In preferred embodiments, the base is substantially rectangular, with multiple stabilizing wings extending out from left and right sides of the base.

Also in preferred embodiments, the width of the base is shorter than the end-to-end length of the stabilizing wings.

A portion of each of the wires insertion molded within the base is preferably flattened to prevent accidental rotation of the wire, thereby tending to prevent the plane of the wire from rotating relative to the base. Additionally or alternatively, a portion of each of the wires insertion molded within the base preferably has a third bend (intermediate the left and right bends) to prevent the plane of the wire from rotating relative to the base.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Figure 2:
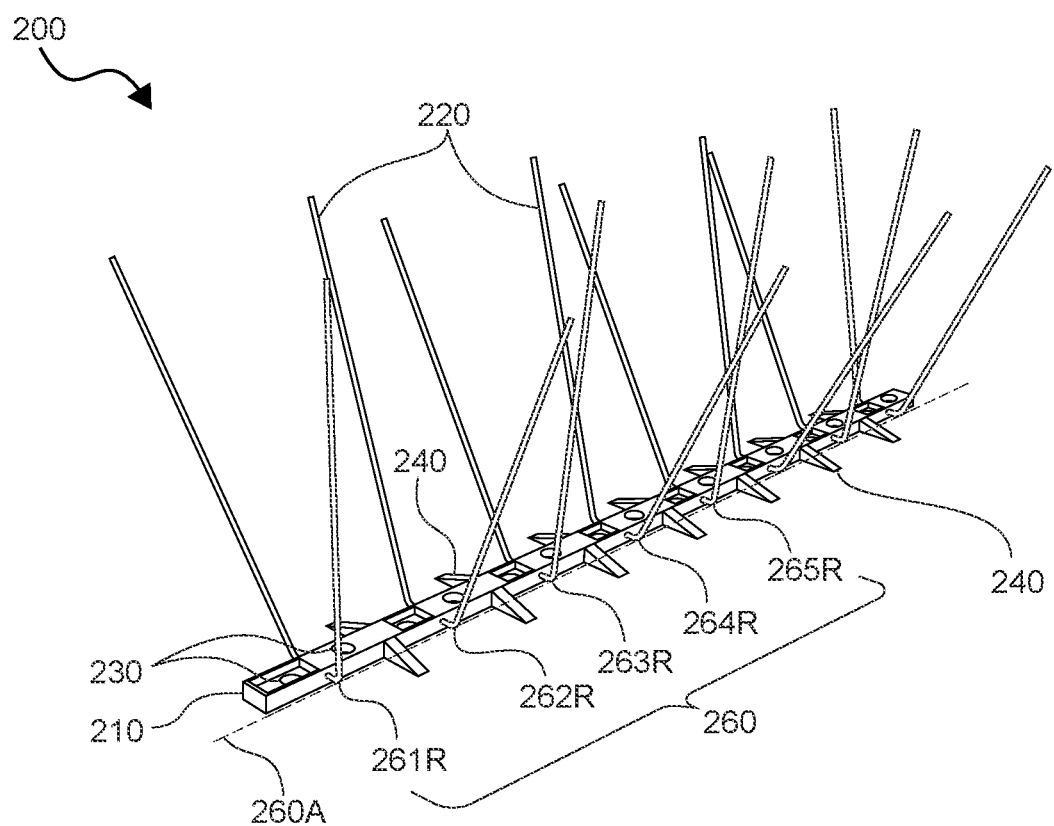
FIG. 2 is a perspective view of an embodiment of a deterrent device according to inventive concepts herein.

FIG. 2 generally depicts an animal deterrent (200) having a longitudinal rectangular base (210) and a plurality of wires/spikes (220) insertion molded within the base (210). Each of the wires (220) is bent upwardly at right and left bends (260) that are positioned in close proximity to the right and left sides of the base (210).

The left bends (not shown) of the first, third and other odd wires (220) of the device are configured to point the corresponding left ends upwards between 90° and 70° with respect to a plane of the bottom of the base. The right bends (261R, 263R) of the first, third and other odd wires (220) are configured to point the corresponding right ends upwards between 50° and 80° with respect to the plane of the bottom of the base.

Additionally, the left bends (not shown) of the second, fourth and other even (220) wires are configured to point the corresponding left ends upwards between 50° and 80° with respect to the plane of the bottom of the base, and the right bends (262R) of the second, fourth and other wires (220) are configured to point the corresponding right ends upwards between 90° and 70° with respect to the plane of the bottom of the base.

As shown in FIG. 2, all of the right side bends (260) are colinear (260A), and the left bends (not shown) are also co-linear.

Figure 1:
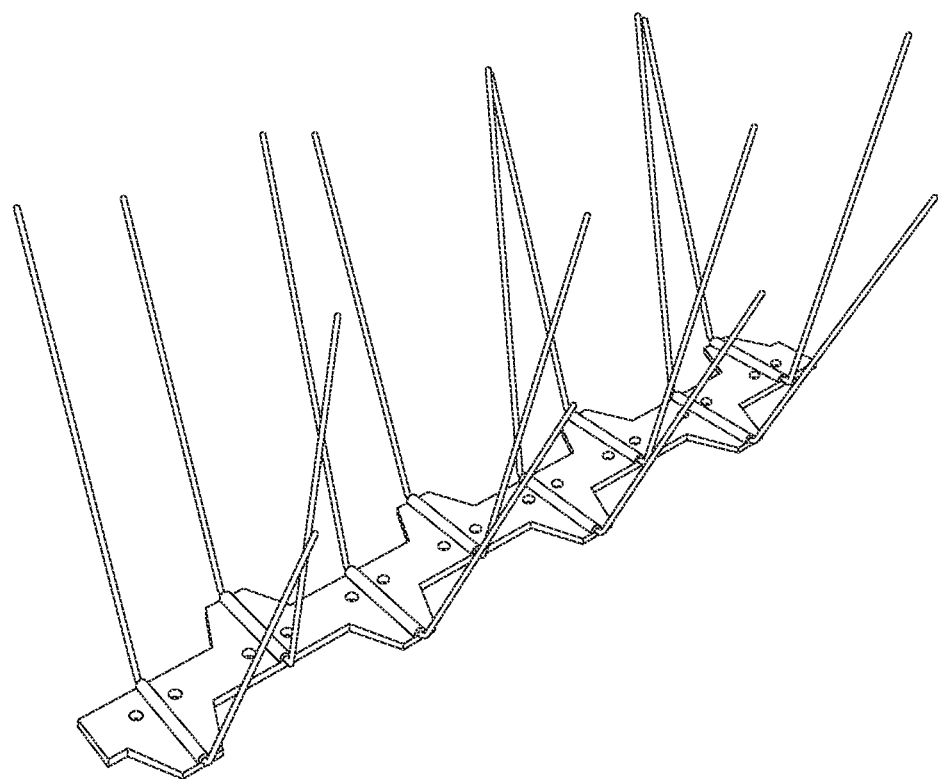
FIG. 1 is a perspective view of a prior art bird deterrent device in which a spike wire is insertion molded within an elongated base.

On the other hand, left or right (260) side bends on sequential (e.g., of the first, second, and third wires) in prior art FIG. 1, are not co-linear. There is a benefit to the non co-linear design of FIG. 1, in that such design stabilizes the device on a surface. However, side extensions of the base is wasteful with respect to both plastic and wire. Although the waste in any single length of base is relatively small, the total amount over thousands of lengths can be large. Accordingly, the device in FIG. 2 is more environmentally friendly.

In preferred embodiments, it is contemplated that multiple stabilizing wings (240) are incorporated into the device to further stabilize the device.

The base and wings are preferably made of polycarbonate or other hard plastic suitable for inclusion molding. The wires are preferably rust-resistant metal alloy.

The cross-sectional shape of the wires (220) can be circular, rectangular, square, triangular, or any other suitable shapes.

Figure 3:
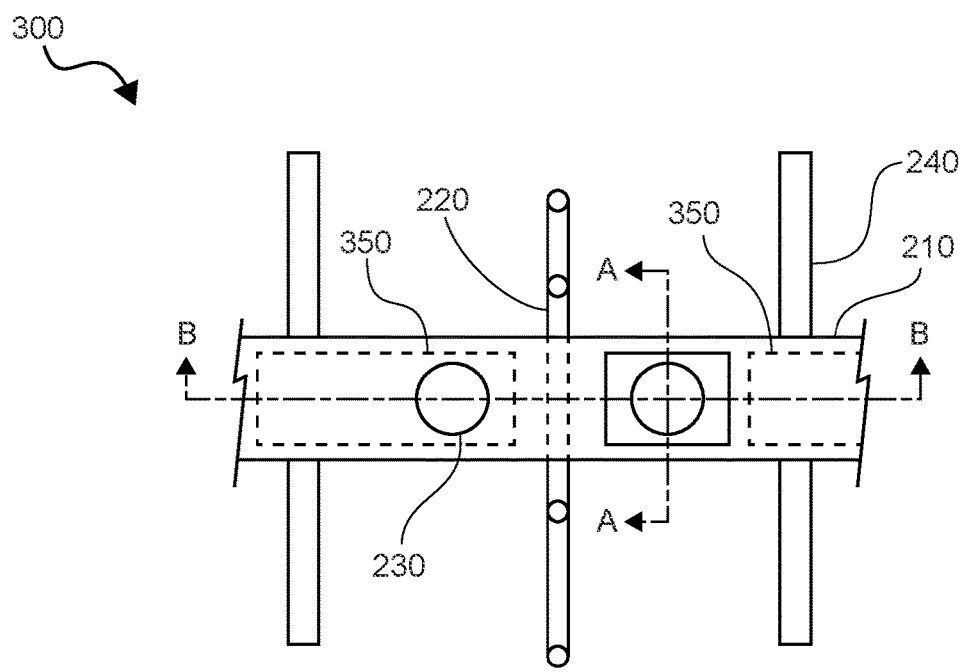
FIG. 3 is a top view of a portion of the deterrent device of FIG. 1.

FIG. 3 shows a top view of a portion of the device 200 of FIG. 1. The wings (240) extend out from right and left sides of the base (210), and are preferably tapered to reduce use of plastic. FIG. 3 shows oppositely extending left and right wings, however it is also contemplated that left and right wings could alternate (not shown). The wings preferably extend out from the sides of the base between 50° and 90°, and preferably at a 90° angle. As viewed from the front or back of the base, wings can be substantially triangular (as shown in FIGS. 2 and 4), but could alternatively be rectangular, curved, or have some other suitable shape.

Device 200 further includes a plurality of holes (230) penetrating from top to bottom of the base (210). In typical installation, a portion of an adhesive placed on the bottom of the base passes up through the holes (230) when the base is pressed down upon a roof or other surface, to secure the device to the surface Alternatively, screws or other fasteners could be positioned in the holes to secure the device to a surface. In preferred embodiments, a plurality of empty spaces (350) can be used to reduce the amount of plastic used in the base (210).

Figure 4:
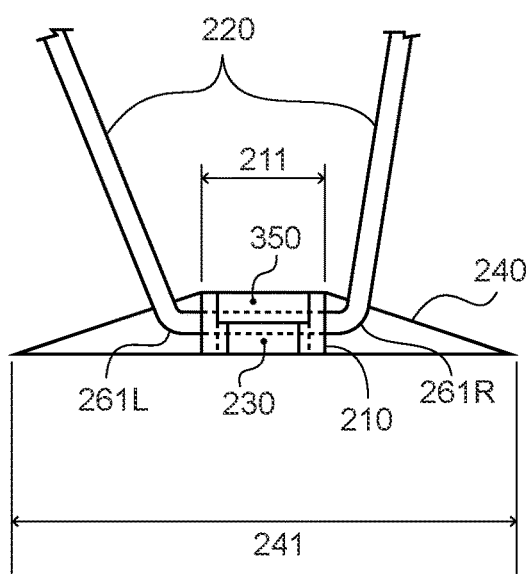
FIG. 4 is a cross-sectional view along an axis A shown in FIG. 3.

FIG. 4 shows a cross-sectional view along an axis-A of FIG. 3. The width (211) of the base (210) is preferably less than 2 cm, more preferably less than 1.5 cm, and most preferably around 1 cm. Bends (261L and 261R) in the wire (220) is preferably positioned less than 2 cm away from axis-B shown in FIG. 3, which is the longitudinal center of the base (210), more preferably less than 1.5 cm away from axis-B, and most preferably 1 cm away from axis-B. In preferred embodiments, an end-to-end distance (241) between the ends of the wings (240L, 240R) is preferably 2-3 times the width (211) of the base (210).

Figure 5:
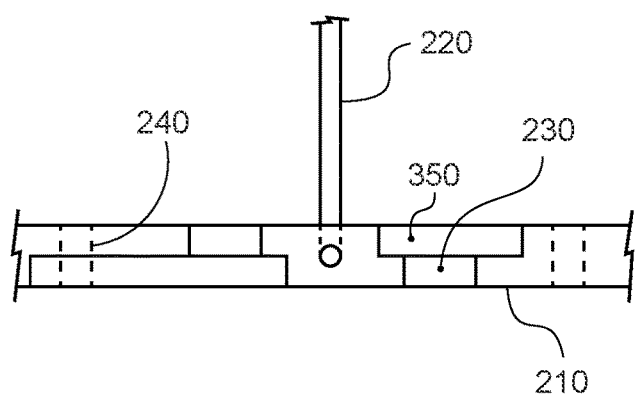
FIG. 5 is a cross-sectional view along an axis B shown in FIG. 3.

FIG. 5 shows a cross-sectional view along an axis-B of FIG. 3. From this perspective the wire (220) appears to be exiting the base in a vertical direction. However, it is also contemplated that wires could exit between 60° and 130° (not shown). FIG. 5 also shows two hole (230) that penetrate through the base (210) from top to bottom, and which might or might not be coupled with an empty space (350).

Figure 6:
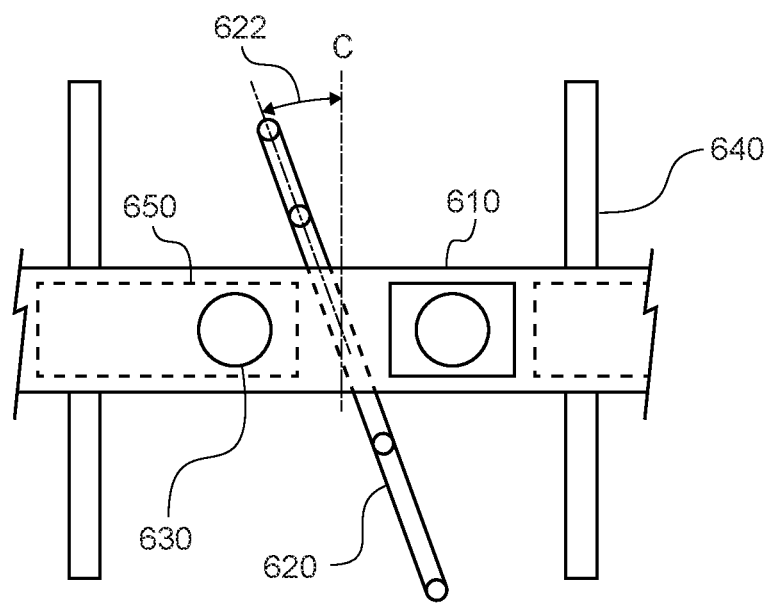
FIG. 6 is a top view of an alternative embodiment of a deterrent device.

FIG. 6 shows a top view of an alternative embodiment of a deterrent device. In contrast to FIG. 2, in which the wires (620) are insertion molded to be positioned normally with respect to the base (610), the wires (620) in this embodiment are insertion molded to be positioned at an angle off normal. The angle (622) of wire (620) with respect to an axis-C is contemplated to be more than 0° but less than 45°, more preferably between 10° and 20°.

Figure 7:
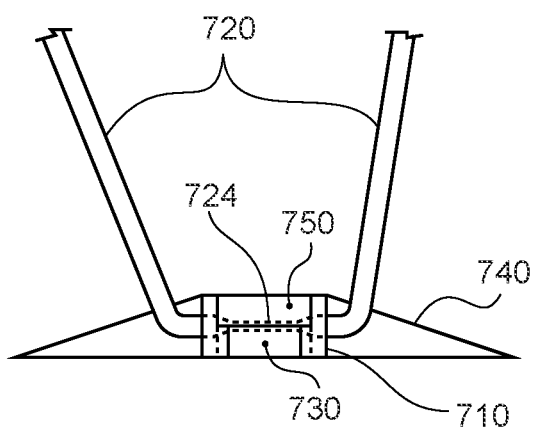
FIG. 7 is a vertical cross-sectional view of another embodiment of a deterrent device.

FIG. 7 shows a vertical cross-sectional view of an embodiment of a deterrent device. The portion of the wire (720) has a generally round cross-section, but at least a portion (724) of the wire within the base (710) is flattened (724), to prevent the wire rotating within the base. The device preferably has a plurality of holes (730) and empty spaces (750).

Figure 8:
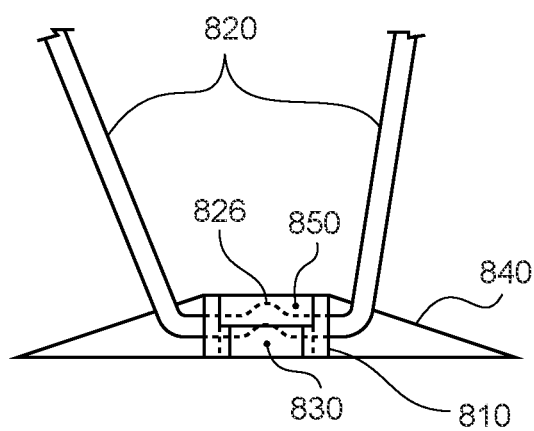
FIG. 8 is a vertical cross-sectional view of another embodiment of a deterrent device.

In FIG. 8, the portion of the wire (820) insertion molded into the base (810) has a bump or other irregular shape (826) to prevent the plane of the wire (820) from rotating relative to the base. The device preferably has a plurality of holes (830) and empty spaces (850).

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An animal deterrent comprising:
   an elongated base having a top and a bottom, and left and right sides;
   first, second, and third wires that each (i) extend through the left and right sides of the base (ii) have corresponding left and right bends that point left and right portions of the respective wires upwards from the base, and base portions between the respective left and right bends;
   in the first wire, a cross-section of the base portion has a different shape from a cross-section of the left portion;
   a first stabilizing wing that extends out of the left and right sides of the base;
   wherein the first, second, and third wires are sequentially positioned; and
   wherein the first stabilizing wing is positioned along the base between the first and second wires.

2. The animal deterrent of claim 1, wherein the left bends of the first and third wires are configured to point the corresponding left ends upwards between 90° and 70° with respect to a plane of the bottom of the base, and the right bends of the first and third wires are configured to point the corresponding right ends upwards between 50° and 80° with respect to the plane of the bottom of the base.

3. The animal deterrent of claim 2, wherein the left bend of the second wire is configured to point the corresponding left end upwards between 50° and 80° with respect to the plane of the bottom of the base, and the right bend of the second wire is configured to point the corresponding right ends upwards between 90° and 70° with respect to the plane of the bottom of the base.

4. The animal deterrent of claim 1, wherein the base is substantially rectangular, with multiple top to bottom channels.

5. The animal deterrent of claim 1, wherein the left bends of the first, second, and third wires are substantially colinear, and the right bends of the first, second, and third wires are substantially colinear.

6. The animal deterrent of claim 1, wherein a portion of the first wire between the corresponding left and right bends has a third bend.

7. The animal deterrent of claim 1, further comprising a second stabilizing wing that extends out of the left and right sides of the base.

8. The animal deterrent of claim 7, wherein the second stabilizing wing is positioned along the base (i) between the second and third wires, and (ii) substantially equidistant from the second and third wires.

9. The animal deterrent of claim 1, wherein the right bends of the first, second, and third wires are spaced apart from the right side of the base.

10. The animal deterrent of claim 1, wherein the cross-section of the base portion is flattened relative to the cross-section of the left portion.

11. The animal deterrent of claim 10, wherein the cross-section of the left portion is round.

\* \* \* \* \*